Oct. 30, 1928.
J. H. BROOKMAN
1,689,772
LIFTING DEVICE FOR VEHICLE WHEELS
Filed April 9, 1927
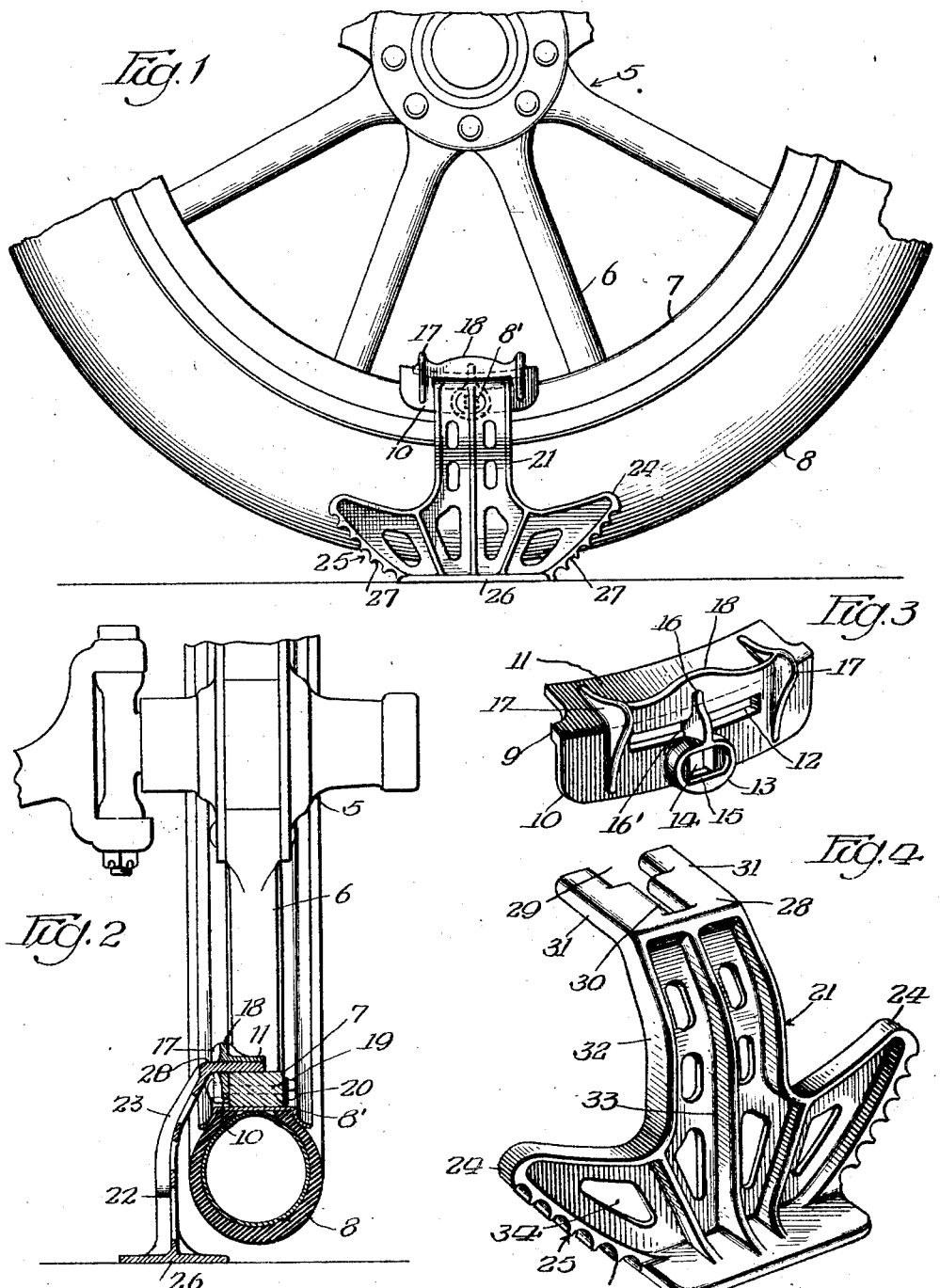

Patented Oct. 30, 1928.

1,689,772

UNITED STATES PATENT OFFICE.

JOHN H. BROOKMAN, OF CEDAR RAPIDS, IOWA.

LIFTING DEVICE FOR VEHICLE WHEELS.

Application filed April 9, 1927. Serial No. 182,307.

This invention relates to a lifting device for raising the wheel of an automobile particularly in connection with the removal and replacement of automobile tires although it is not particularly limited to this specific use.

The device is applied to the wheel of an automobile and is effected by the power of the vehicle. The device may be attached at any particular location of the wheel although it has been found preferable to secure this device to the wheel opposite to the valve stem on automobiles which use pneumatic tires.

The device is principally made in two parts which cooperate with each other to perform the function intended. One part is permanently attached to the automobile wheel and the other part is adapted to cooperate therewith when the occasion arises.

The object of this invention is to provide a clamping member which is permanently attached to an autombile wheel felly and a removable one-piece structure cooperating with the clamping member to lift the vehicle wheel above the ground under the vehicle's own power.

Another object thereof is to provide a lifting device which is simple and durable in construction, readily and economically manufactured, and which is quickly and easily applied to the wheel.

Another object thereof is to provide improved means for attaching a lifting device to an automobile wheel.

Further objects and advantages will hereinafter appear.

In the accompanying drawings embodying the invention

Fig. 1 is a detailed elevation of an automobile wheel and having the device attached thereto.

Fig. 2 is a detail sectional view.

Fig. 3 is a perspective view of the attaching member.

Fig. 4 is a front perspective view of a one-piece lifting device so formed that it will cooperate with the attaching member.

Referring to the drawings, 5 indicates a vehicle wheel comprising spokes 6 connected to a felly 7, and a pneumatic tire 8.

An attaching member is applied to the felly of the wheel preferably at a point opposite to the valve stem and ordinarily permanently applied to the felly. In order to attach this member to an automobile wheel felly it is necessary that the felly be provided with a hole 8' extending therethrough to accommodate a bolt for securing the attaching member thereto. The fellies of automobile wheels are ordinarily made of pressed steel but may be made of any other material.

The attaching member comprises an angular plate 9 having a front side 10 and a top 11. A slot 12 is provided in the side 10 to receive a member hereinafter to be described.

Projecting outwardly from the front side 10 and disposed below the slot 12 is an annular flange 13 surrounding the square opening 14 in the front side 10. An opening 15 formed by the annular flange is slightly larger but in alignment with the hole 14 and may be any shape desired.

An upwardly extending lug 16 integrally connects the angular flange 13 and the front side 10 and divides the slot 12. This lug strengthens the plate and forms a bearing for the bolt. The lug 16 has a projection 16' formed thereon which extends through the slot 12. When the plate is secured to the wheel felly the projection 16' engages the top of the felly and spaces the plate therefrom a sufficient distance to accommodate a part of the body to be later described.

Outwardly projecting lugs 17 are integrally connected to the front side 10 and top 11 to strengthen the member 9 and prevent the same from straightening due to any pressure that may be applied in attaching the plate to the felly. A web 18 integrally connects the lugs 17 to further strengthen the plate 9 and add rigidity thereto. This construction is all clearly shown in Fig. 3.

The plate 9 is applied to the inner side of the felly and is rigidly attached thereto by means of a bolt 19 passing through the hole 15 in the plate and in alignment with the hole 8' provided in the felly to receive the bolt.

The bolt 19 is preferably a carriage bolt having a square shank which fits into the square hole 14 in the plate 9. By tightening the nut 20 on the bolt 19 the plate is rigidly fastened to the felly and the bolt is prohibited from turning. These parts are comparatively small and compact and are preferably attached to the wheel on the inner side thereof and are not conspicuous from the outside of the wheel. The only part of these members which can be seen from the outside of the wheel are the nut 20 and a small part of the plate 9 which is not deemed objectionable.

Cooperating with the plate is a body 21 which forms the main part of the lifting device. The body has a vertical portion 22 and an inclined portion 23 to provide the necessary clearance between the body and the automobile tire as clearly shown in Fig. 2. Integrally connected to the body are side extensions 24 having their lower edges rounded or inclined as at 25 to allow the wheel to easily ride up on the base 26 which integrally connects the side extensions and the body. A series of teeth 27 are formed on the bottom or inclined edge of the side extensions to form a gripping surface for the device.

Integrally connected to the upper end of the body and substantially at right angles thereto is a lug 28. This lug has a wide slot 29, and a narrow slot 30 extending rearwardly from the slot 29 and substantially in the middle of the lug 28. By slotting the lug in this manner the parallel legs 31 are provided. The lug or projection 28 is inserted through the slot 12 which is positioned above the top of the felly, and the slots 29 and 30 formed in the lug 28 allow the body to be attached to the wheel. The legs 31 straddle the lug 16 and are clamped between the felly and the plate and held in relative position and securely maintain the body in place.

It may also be deemed preferable to attach one of the plates to each of the vehicle wheels so that the body may be readily attached to any wheel in case of emergency, it not being necessary or advantageous to apply the plates after the emergency arises.

It is understood of course, that each of the vehicle wheels is provided with the necessary hole 8' through the felly beforehand, so that the plates may be readily attached thereto. It is preferable that this hole be provided during the making of the felly rather than drilling it after the wheel is assembled as only a single bolt is required for attaching the plate to the felly.

The body 21 may also be provided with a peripheral flange 32 to strengthen the body and add rigidity thereto. Suitable webs 33 may be positioned at various places throughout the body and connect the base and the flange to further strengthen the body. If desirable the body may have perforations 34 to decrease the weight of the device.

It will be seen that an improved and superior device has been provided which is easily applied and eliminates all the difficulty which arises in using jacks of the ordinary type, the power of the vehicle being employed to accomplish the lifting of the vehicle.

It will further be understood that various changes may be made in form, construction and arrangement of the parts without departing from the spirit and scope of the invention or sacrificing any of its material advantages the form herein described being merely a preferred embodiment of my invention.

The invention is claimed as follows:

1. In combination with an automobile wheel having a hole formed in the side of the felly thereof, a lifting device comprising a plate having a hole and a slot therein, means passing through said hole in said plate and said felly for attaching said plate to said felly, means formed on said plate to space the top of said plate from said felly, a body having a pair of legs for engaging said slot and straddling said last named means, extensions having inclined bottoms integrally formed on said body, and a base connecting said body and said extensions.

2. In combination with an automobile wheel having a hole formed in the felly thereof, a lifting device comprising a plate having a hole and a slot therein, means passing through said hole in said plate and said felly for attaching said plate to said felly, means formed on said plate to space the top of said plate from said felly, a perforated body having a slotted lug formed thereon for engaging said slot and forming legs to straddle said last named means, extensions having inclined bottoms formed on said body, teeth formed on said inclined bottoms, and a flat base integrally connecting said body and said extensions, said body having an inclined portion to space the same from said wheel.

3. In combination with an automobile wheel having a hole formed in the felly thereof, a lifting device comprising a plate having a hole and a slot therein, a bolt passing through said hole in said plate and said felly for attaching said plate to said felly, a projection formed on said plate and extending through said slot to space the top of said plate from said felly, a perforated body having a lug formed thereon for engaging said slot, extensions having inclined bottoms integrally formed on said body, teeth formed on said inclined bottoms, and a base integrally connecting said body and said extensions.

4. In combination with an automobile wheel having a hole formed in the felly thereof, a lifting device comprising a plate having a hole and a slot therein, a bolt passing through said hole in said plate and said felly for attaching said plate to said felly, a projection formed on said plate and extending through said slot to space the top of said plate from said felly, a perforated body having a slotted lug formed thereon for engaging said slot and forming legs to straddle said projection, extensions having inclined bottoms formed on said body, teeth formed on said inclined bottoms, and a flat base integrally connecting said body and said extensions, said body having an inclined portion to space the same from said wheel.

5. The combination with an automobile wheel having a felly, of a lifting device adapted to be attached to said wheel, said felly being provided with a hole through the sides thereof, a plate having a slot therein, a lug dividing said slot, a single means passing through said hole and the side of the plate for attaching said plate to said felly for supporting said lifting device, and a pair of legs on the end of said lifting device and straddling said lug when the legs are inserted in the slot of said plate.

6. In a combination with an automobile wheel having a hole formed in the felly thereof, a lifting device comprising a plate having a hole and a slot therein, means passing through said hole in said plate and said felly for attaching said plate to said felly, means formed on said plate to space the top of said plate from said felly, a perforated body having a slotted lug formed thereon for engaging said slot and forming legs to straddle said last named means, extensions having inclined bottoms formed on said body, teeth formed on said inclined bottoms, a flat base integrally connecting said body and said extensions, said body having an inclined portion to space the same from said wheel, a peripheral flange formed on said body to strengthen the same, and webs connecting said flange and said base to strengthen said body.

7. In combination with an automobile wheel having a hole formed in the felly thereof, a lifting device comprising a plate having a hole and a slot therein, a bolt passing through said hole in said plate and said felly for attaching said plate to said felly, a projection formed on said plate and extending through said slot to space the top of said plate from said felly, a perforated body having a slotted lug formed thereon for engaging said slot and forming legs to straddle said projection, extensions having inclined bottoms formed on said body, teeth formed on said inclined bottoms, a flat base integrally connecting said body and said extensions, said body having an inclined portion to space the same from said wheel, a peripheral flange formed on said body to strengthen the same, and webs connecting said flange and said base to further strengthen said body.

JOHN H. BROOKMAN.